(12) United States Patent
Osamura et al.

(10) Patent No.: US 7,100,547 B2
(45) Date of Patent: Sep. 5, 2006

(54) INTAKE-AIR CONTROL SYSTEM FOR ENGINE

(75) Inventors: Kensuke Osamura, Tochigi (JP); Hiroshi Iwano, Kanagawa (JP); Kenji Oota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 349 days.

(21) Appl. No.: 10/715,371

(22) Filed: Nov. 19, 2003

(65) Prior Publication Data

US 2004/0112310 A1    Jun. 17, 2004

(30) Foreign Application Priority Data

Dec. 16, 2002   (JP)   ............... 2002-364373

(51) Int. Cl.
F02B 75/04   (2006.01)

(52) U.S. Cl. .................................. 123/48 B

(58) Field of Classification Search ............. 123/48 B, 123/78 E, 78 F, 197.4
See application file for complete search history.

(56) References Cited

U.S. PATENT DOCUMENTS 6,505,582 B1   1/2003   Moteki et al.
6,553,949 B1 *   4/2003   Kolmanovsky et al. ... 123/48 B

FOREIGN PATENT DOCUMENTS

| JP | 7-229431 A | 8/1995 |
|---|---|---|
| JP | 2002-21592 A | 1/2002 |

* cited by examiner

*Primary Examiner*—Stephen K. Cronin
*Assistant Examiner*—Hyder Ali
(74) *Attorney, Agent, or Firm*—Foley & Lardner LLP

(57) ABSTRACT

An intake-air control system for an engine enabling an intake-air quantity and a compression ratio to be variably controlled, includes sensors detecting engine operating conditions and the compression ratio, and a control unit electronically connected to the sensors for feedback-controlling the intake-air quantity based on the compression ratio as well as the engine operating conditions, while feedback-controlling the compression ratio based on the engine operating conditions. The control unit executes phase-matching between an intake-air quantity change occurring based on intake-air quantity control and a compression ratio change occurring based on compression ratio control, considering a relatively slower response in the compression ratio change than a response in the intake-air quantity change.

19 Claims, 17 Drawing Sheets

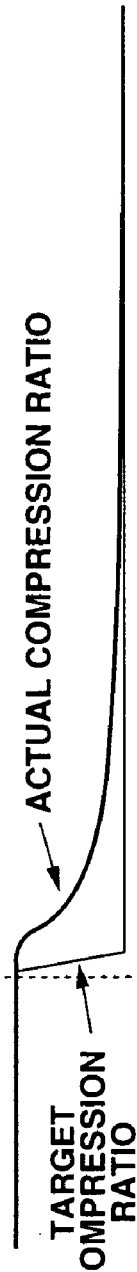
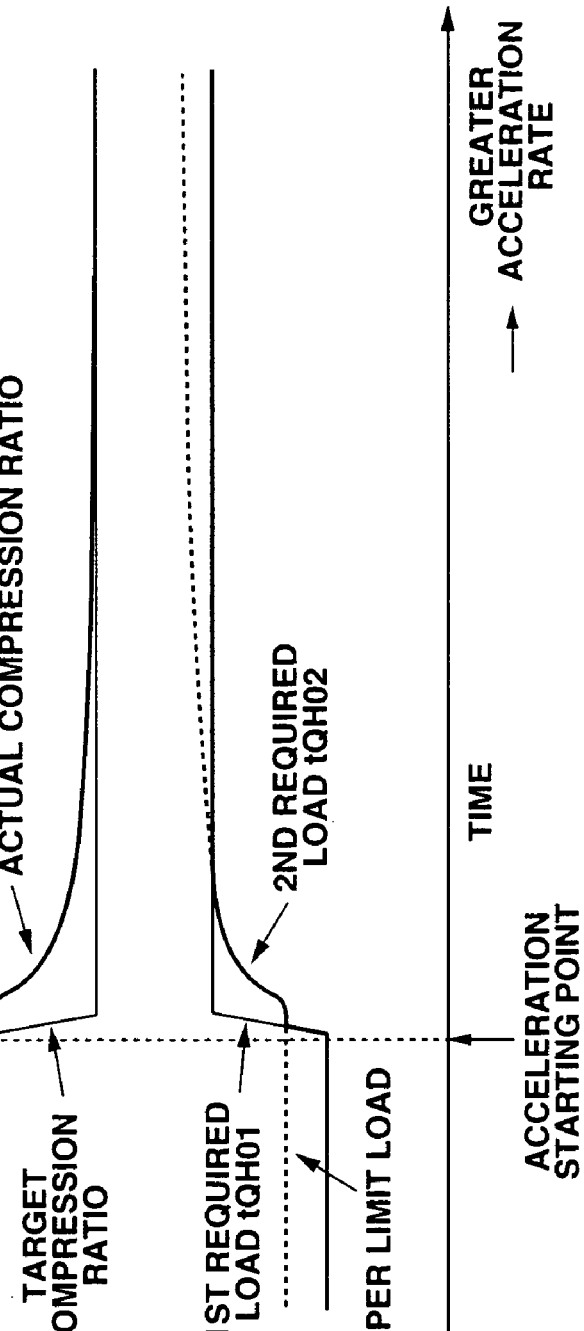
FIG.18A
FIG.18B
FIG.18C

INTAKE-AIR CONTROL SYSTEM FOR ENGINE

TECHNICAL FIELD

The present invention relates to an intake-air control system for an engine employing a variable compression ratio mechanism capable of variably controlling a compression ratio of the engine, and specifically to the improvement of an intake-air quantity control technology for a variable-compression-ratio mechanism equipped engine.

BACKGROUND ART

As is generally known, on the one hand, the higher the compression ratio of an internal combustion engine, the better the fuel consumption rate can be reduced. On the other hand, during high engine operation, there is an increased tendency for engine knock to occur. Therefore, on engines equipped with variable compression ratio mechanisms, in order to ensure a reduced fuel consumption rate, while avoiding undesirable knocking from occurring, the compression ratio must be controlled in such a manner as to be increased to a high compression ratio during low engine-load operation, and to be reduced down to a low compression ratio during high engine-load operation. One such variable compression ratio mechanism equipped engine has been disclosed in Japanese Patent Provisional Publication No. 7-229431 (hereinafter is referred to as "JP7-229431"). The variable compression ratio mechanism or the compression ratio controller disclosed in JP7-229431, includes a variable volumetric-capacity chamber, which is opened to the combustion chamber, and whose volume can be variably adjusted by means of a slidable compression-ratio control piston that is movable in a direction the volume of the variable volumetric-capacity chamber increases during the high load operation and in a direction the volume of the variable volumetric-capacity chamber decreases during the low load operation.

Instead of using the variable volumetric-capacity chamber attached onto the combustion chamber, the compression ratio can be adjusted by varying a piston stroke characteristic, that is, a top dead center (TDC) and/or a bottom dead center. A variable compression ratio mechanism of a reciprocating internal combustion engine, capable of variably controlling the compression ratio by varying the piston stroke characteristic, has been disclosed in Japanese Patent Provisional Publication No. 2002-21592 (hereinafter is referred to as "JP2002-021592").

Generally, when changing the engine/vehicle operating condition from the steady-state running state to the accelerating state with an accelerator opening increasing in a stepwise manner, a quantity of air drawn into engine cylinders tends to increase with a response delay such as 0.1 seconds as compared to a timing of the driver's accelerator depression. On the other hand, in the systems as disclosed in JP7-229431 and JP2002-021592, in such high-load transient maneuvers, the compression ratio is reduced for the purpose of knocking avoidance, but the response in compression-ratio change occurring based on the compression ratio control is generally slower than that in intake-air quantity change occurring based on the intake-air quantity control. In case of the relatively slower response in compression-ratio change, although the quantity of fresh air drawn into engine cylinders reaches a stationary level, the systems as disclosed in JP7-229431 and JP2002-021592 exhibit a transient compression-ratio response that the compression ratio does not completely drop down to a designated low compression ratio. This means a possibility of undesirable engine knocking, occurring during such high-load transient maneuvers. The avoidance of engine knocking, occurring due to the relatively slower response in compression-ratio change, would be desirable even in transient maneuvers such as during a vehicle's accelerating condition.

SUMMARY OF THE INVENTION

Accordingly, it is an object of the invention to provide an improved intake-air control system for an engine that certainly suppresses engine knocking from occurring by optimally controlling a quantity of intake air drawn into the engine, taking into account a relatively slower response in compression-ratio change than a response in intake-air quantity change.

In order to accomplish the aforementioned and other objects of the present invention, an intake-air control system for an engine employing a variable intake-air quantity mechanism that variably controls a quantity of fresh air entering the engine and a variable compression ratio mechanism that variably controls a compression ratio of the engine, comprises sensors that detect engine operating conditions and the compression ratio, and a control unit configured to be electronically connected to the sensors, the variable intake-air quantity mechanism, and the variable compression ratio mechanism for controlling the variable intake-air quantity mechanism based on the compression ratio as well as the engine operating conditions.

According to another aspect of the invention, an intake-air control system for an engine enabling an intake-air quantity and a compression ratio to be variably controlled, comprises sensors that detect engine operating conditions and the compression ratio, a control unit configured to be electronically connected to the sensors for feedback-controlling the intake-air quantity based on the compression ratio as well as the engine operating conditions, while feedback-controlling the compression ratio based on the engine operating conditions, and the control unit executing phase-matching between an intake-air quantity change occurring based on intake-air quantity control and a compression ratio change occurring based on compression ratio control, considering a relatively slower response in the compression ratio change than a response in the intake-air quantity change.

According to a further aspect of the invention, an intake-air control system for an engine employing a variable intake-air quantity mechanism that variably controls a quantity of fresh air entering the engine and a variable compression ratio mechanism that variably controls a compression ratio of the engine, comprises sensor means for detecting engine operating conditions and the compression ratio, and control means configured to be electronically connected to the sensor means, the variable intake-air quantity mechanism, and the variable compression ratio mechanism for controlling the variable intake-air quantity mechanism based on the compression ratio as well as the engine operating conditions.

According to a still further aspect of the invention, a method of variably controlling an intake-air quantity of fresh air entering an engine and a compression ratio of the engine, the method comprises detecting engine operating conditions and the compression ratio, feedback-controlling the intake-air quantity based on the compression ratio as well as the engine operating conditions, while feedback-controlling the compression ratio based on the engine operating conditions, and executing phase-matching between an intake-air quantity change occurring based on intake-air quantity control and a compression ratio change occurring based on compression ratio control, considering a relatively slower response in the compression ratio change than a response in the intake-air quantity change.

The other objects and features of this invention will become understood from the following description with reference to the accompanying drawings.

BRIEF DESCRIPTION OF THE DRAWINGS

FIGS. 18A–18C are time charts explaining the operation and effects of the system of the first embodiment during an accelerating condition.

DESCRIPTION OF THE PREFERRED EMBODIMENTS

Figure 1:
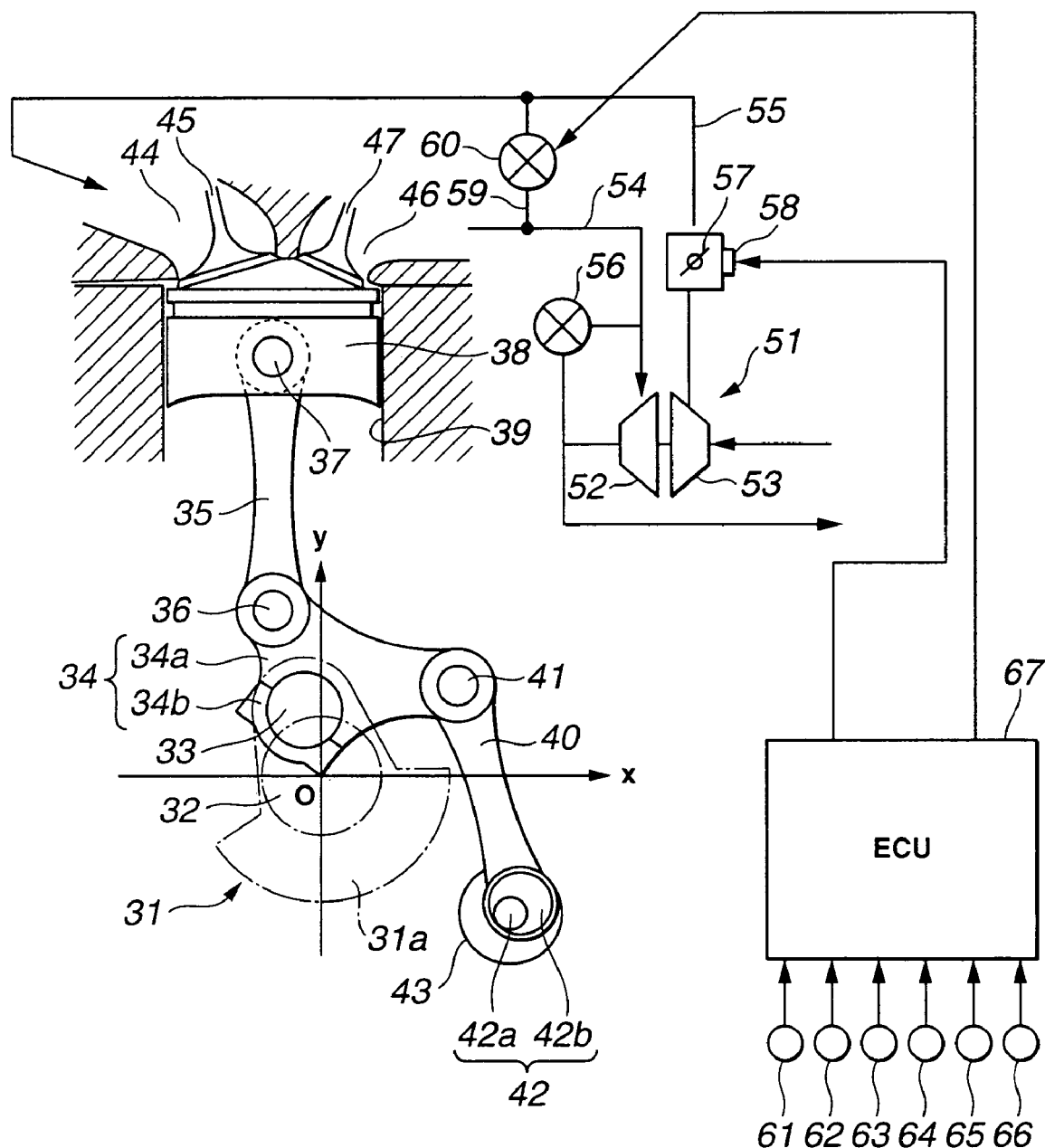
FIG. 1 is a system diagram illustrating an embodiment of an intake-air control system for an engine equipped with a variable compression ratio mechanism.

Referring now to the drawings, particularly to FIG. 1, the intake-air control system of the embodiment is exemplified in a reciprocating internal combustion engine equipped with a multi-link piston crank mechanism, which serves as a variable compression ratio mechanism capable of varying a piston stroke characteristic such as a top dead center (TDC) position of a reciprocating piston and a bottom dead center (BDC) position. A crankshaft 31 is formed with a plurality of crank journals (main bearing journals) 32, a plurality of crankpins 33, and a plurality of counterweights 31a. Crank journal 32 is provided for each engine cylinder. Crank journals 32 are rotatably supported by means of main bearings (not shown) and main bearing caps (not shown), which are attached to an engine cylinder block by means of cap screws. The axis of each of crank journals 32 is identical to the axis (rotation center) of crankshaft 31. The axis of crankpin 33 is eccentric to the axis of the axis of crank journal 32 by a predetermined distance. A lower link (a second link) 34 is rotatably connected to crankpin 33. As viewed from the axial direction, lower link 34 is formed as a substantially T-shaped link and has a half-split structure. Lower link 34 is comprised of a main lower-link portion 34a and a cap portion 34b bolted to main lower-link portion 34a in such a manner as to sandwich crankpin 33 between the half-round section of main lower-link portion 34a and the half-round section of cap portion 34b. An upper link (a first link) 35 is rotatably connected at its lower end to one side of main lower-link portion 34a of lower link 34 by means of a connecting pin 35. Upper link 35 is also rotatably connected at its upper end to a reciprocating piston 38 by means of a piston pin 37. During operation of the engine, the piston crown of piston 38 receives combustion pressure, and reciprocates through a stroke in a cylinder 39 formed in the cylinder block. An intake valve 45 is operably mounted on the upper portion of cylinder 39 to open and close an intake port 44 in synchronism of rotation of crankshaft 31, whereas an exhaust valve 47 is operably mounted on the upper portion of cylinder 38 to open and close an exhaust port 46 in synchronism of rotation of crankshaft 31. A control link (a third link) 40 is rotatably connected at its upper end to the other side of main lower-link portion 34a by means of a connecting pin 41, and also rotatably or rockably connected to at its lower end to the engine body (the cylinder block) via a control shaft 42 so that oscillating motion of control link 40 relative to the engine body is permitted. Control shaft 42 is comprised of a relatively small-diameter control-shaft portion 42a, which is fixedly coaxially connected to a drive shaft 43b (described later) of a compression-ratio control actuator 43 mounted on the engine body, and a relatively large-diameter control-shaft portion 42b, which serves as an eccentric cam whose axis is eccentric to the axis of small-diameter control-shaft portion 42a. Small-diameter control-shaft portion 42a and large-diameter control-shaft portion 42b are fixed to each other. The lower end of control link 40 is fitted to large-diameter control-shaft portion 42b so as to permit oscillating motion of control link 40 about the axis of large-diameter control-shaft portion 42b.

The angular position of small-diameter control-shaft portion 42a is adjusted by compression-ratio control actuator 43. When small-diameter control-shaft portion 42a is rotated or driven by compression-ratio control actuator 43 depending on engine operating conditions such as engine speed and engine load, the axis of large-diameter control-shaft portion 42b revolves on the axis of small-diameter control-shaft portion 42a to cause relative displacement of the axis of large-diameter control-shaft portion 42b to the engine body (cylinder block). As a result, large-diameter control-shaft portion 42b is kept at a given angular position with respect to the axis of small-diameter control-shaft portion 42a, and therefore a pivot of oscillating motion of the lower end of control link 40 varies depending on the engine operating conditions. Varying the pivot of oscillating motion of control link 40 means a change in the piston stroke characteristic of piston 38, that is, the TDC position and/or the BDC position. In more detail, as shown in FIG. 1, on the assumption that the rotation center of crankshaft 31, that is, the axis of crank journal 32 is defined as the origin O, a directed line Ox parallel to a direction (major and minor side thrust directions) perpendicular to piston pin 37 and a trace line of reciprocating motion of the axis of piston pin 37 as viewed from the direction of the axis of piston pin 37 is taken as an x-axis, whereas a directed line Oy parallel to the previously-noted trace line of reciprocating motion of the axis of piston pin 37 is taken as a y-axis. The directed lines Ox and Oy intersect at a right angle at the origin O. The trace line of reciprocating motion of the axis of piston pin 37 generally corresponds to the centerline of cylinder 39. Varying the pivot of oscillating motion of control link 40 also means varying the coordinates of the axis of large-diameter control-shaft portion 42b, because the axis of large-diameter control-shaft portion 42b serves as the pivot of oscillating motion of control link 40. Varying the coordinates of the axis of large-diameter control-shaft portion 42b varies the initial position of piston pin 37, thus changing the piston stroke characteristic in the y-axis direction, exactly, in the direction of the trace line of reciprocating motion of the axis of piston pin 37. As a consequence, the compression ratio is controlled to a desired ratio based on the engine operating conditions. Compression-ratio control actuator 43 is constructed in a manner so as to be able to support small-diameter control-shaft portion 42a against a reaction force transferred from control link 40 to control shaft 42 at an arbitrary angular position thereof. In the shown embodiment, a hydraulically-operated vane type actuator is used as compression-ratio control actuator 43.

Figure 2:
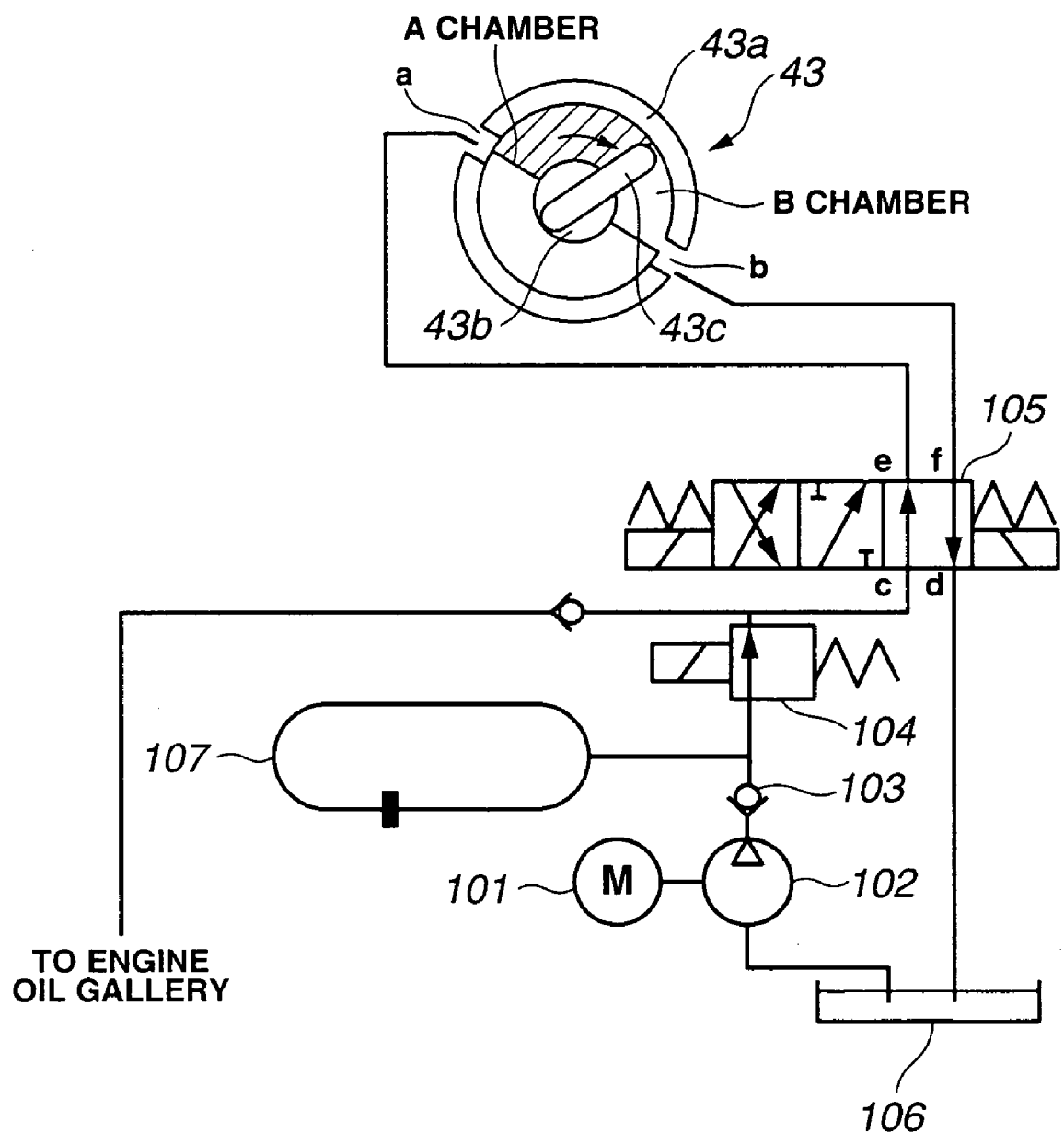
FIG. 2 is an explanatory view explaining the operation of the variable compression ratio mechanism of FIG. 1, required to switch to a low compression ratio.
Figure 3:
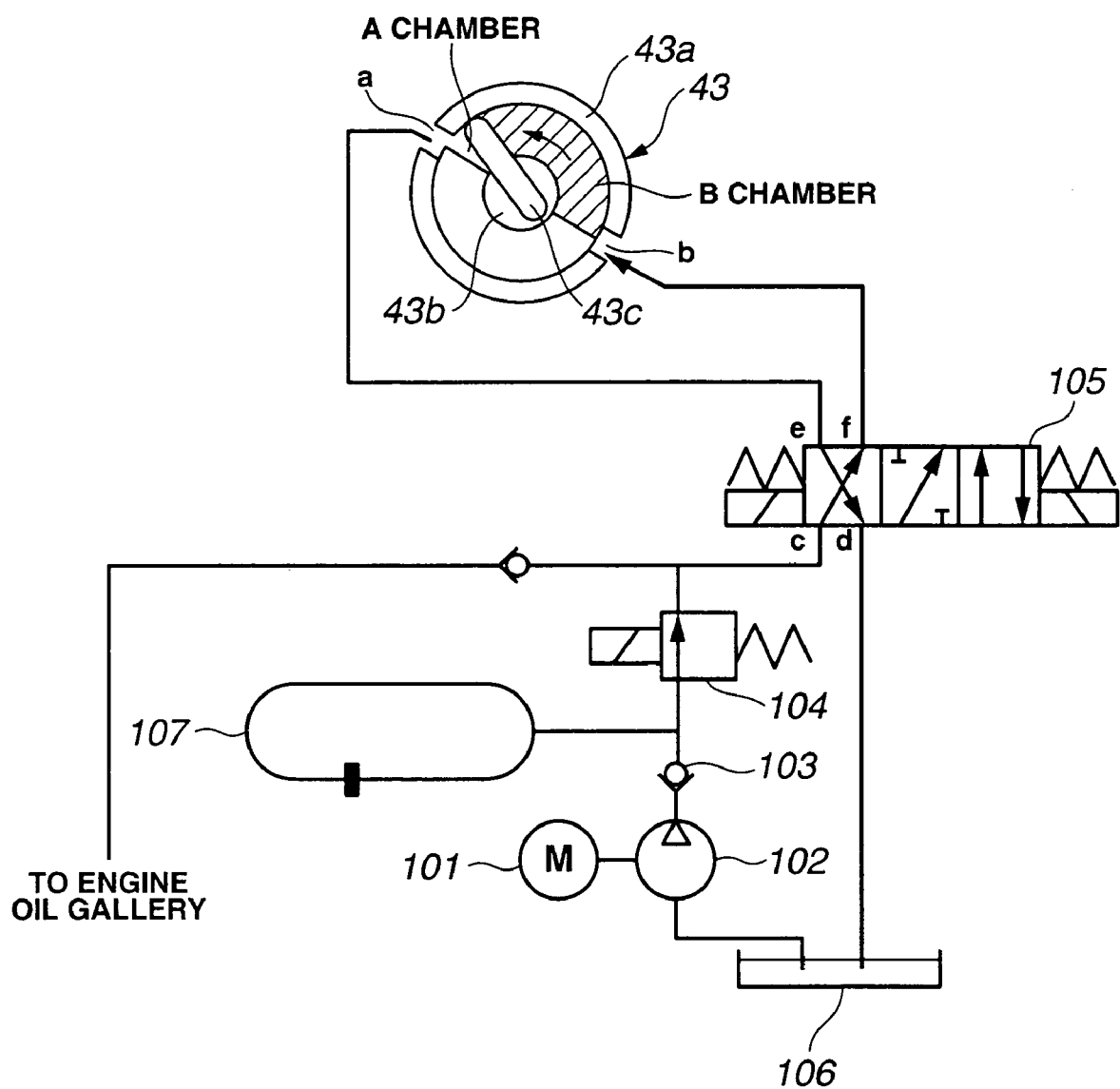
FIG. 3 is an explanatory view explaining the operation of the variable compression ratio mechanism of FIG. 1, required to switch to a high compression ratio.
Figure 4:
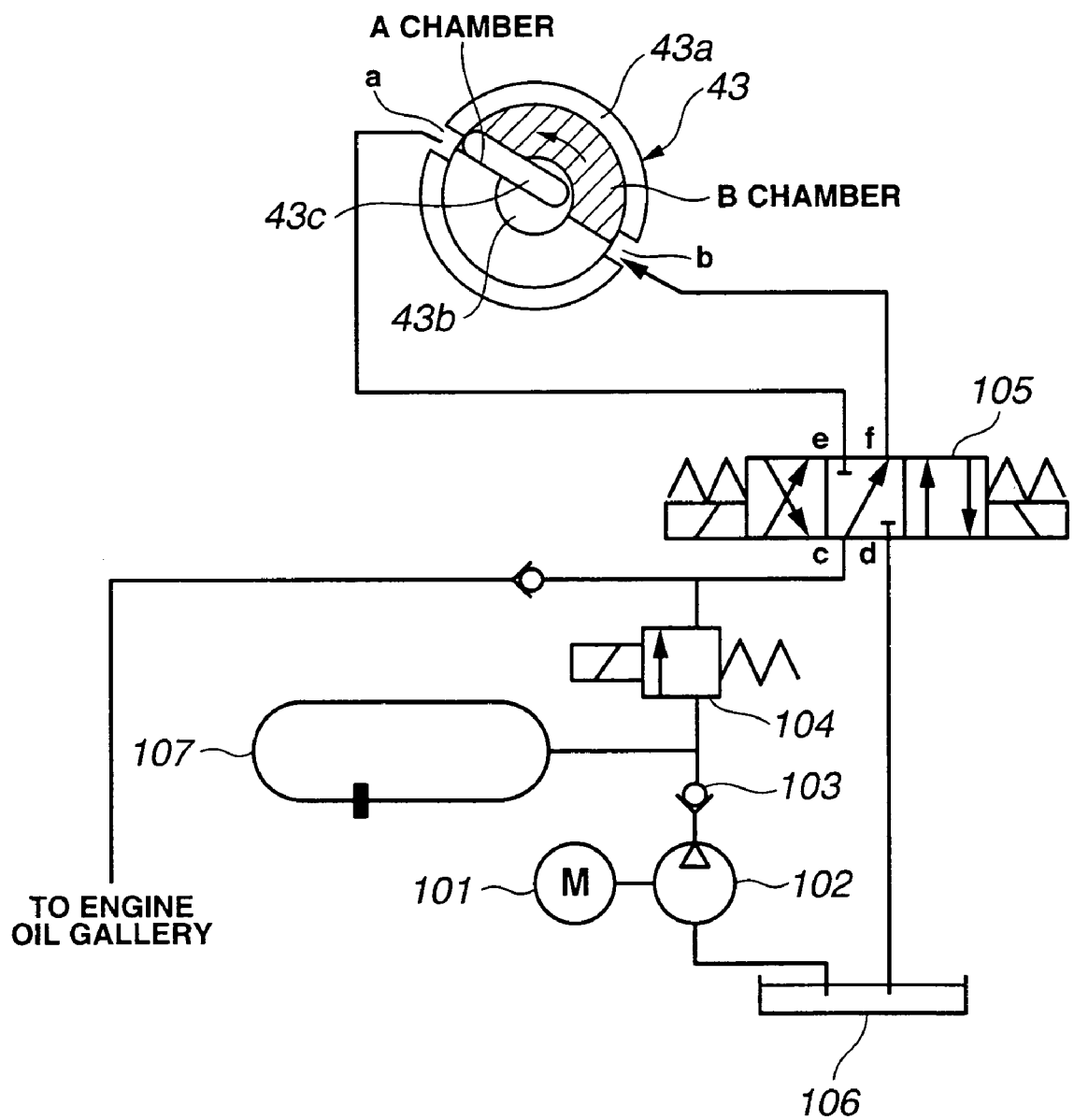
FIG. 4 is an explanatory view explaining the operation of the variable compression ratio mechanism of FIG. 1, required to maintain the compression ratio at the high level.

Referring now to FIGS. 2–4, there are shown the detailed structures of compression-ratio control actuator 43 and the hydraulic system that hydraulically operates compression-ratio control actuator 43. In FIGS. 2–4, compression-ratio control actuator 43 is comprised of a housing 43a, a drive shaft 43b, which is rotatably accommodated in housing 43a and fixedly connected to small-diameter control-shaft portion 42a so that small-diameter control-shaft portion 42a and drive shaft 43b are coaxially arranged with each other, and a radially-extending vane 43c, which is fixedly connected to drive shaft 43b. Vane 43c functions to partition the internal space of housing 43a into a first variable volumetric-capacity chamber (hereinafter is referred to as "A chamber") and a second variable volumetric-capacity chamber (hereinafter is referred to as "B chamber"). On the other hand, the outlet port of an oil pump 102, which is driven by way of an electric motor 101, is connected through a one-way check valve 103 and a shut-off valve 104 to a port c of a directional control valve 105. A port d (a drain port) of directional control valve 105 is connected to the low-pressure side, that is, an oil pan 106. A port e of directional control valve 105 is connected to a port a of compression-ratio control actuator 43, whereas a port f of directional control valve 105 is connected to a port b of compression-ratio control actuator 43. A pressure accumulator 107 is connected to a branch oil line, which is branched from the hydraulic line between check valve 103 and shut-off valve 104. A branch oil line, which is branched from the hydraulic line between shut-off valve 104 and directional control valve 105, is connected to an engine oil gallery. As can be seen from FIGS. 2–4, in the hydraulic system of the shown embodiment, directional control valve 105 is comprised of a solenoid-operated three-position spool valve.

Under the operating mode of the hydraulic system shown in FIG. 2, shut-off valve 104 is fully opened, and additionally directional control valve 105 is kept at the leftmost valve shift position (viewing FIG. 2). High-pressure working fluid, discharged from oil pump 102, is supplied through shut-off valve 104, the ports c and e of directional control valve 105, and the port a of compression-ratio control actuator 43 into A chamber. On the other hand, working fluid in B chamber is returned through the port b of compression-ratio control actuator 43 and the ports f and d of directional control valve 105 to oil pan 106. Thus, the volume of A chamber increases and the volume of B chamber decreases, with the result that compression-ratio-control-actuator drive shaft 43b, in other words, small-diameter control-shaft portion 42a rotates in the clockwise direction together with the radially-extending vane 43c. Clockwise rotation of small-diameter control-shaft portion 42a varies the pivot of oscillating motion of control link 40 such that the compression ratio is controlled or adjusted to a low compression ratio.

In contrast to the above, in presence of a transition from the state of the hydraulic system shown in FIG. 2 to the state shown in FIG. 3, that is, when directional control valve 105 is shifted to the rightmost valve shift position (viewing FIG. 3) with shut-off valve 104 fully opened, high-pressure working fluid, discharged from oil pump 102, is supplied through shut-off valve 104, the ports c and f of directional control valve 105, and the port b of compression-ratio control actuator 43 into B chamber. On the other hand, working fluid in A chamber is returned through the port a of compression-ratio control actuator 43 and the ports e and d of directional control valve 105 to oil pan 106. Thus, the volume of B chamber increases and the volume of A chamber decreases, with the result that compression-ratio-control-actuator drive shaft 43b, in other words, small-diameter control-shaft portion 42a rotates in the anticlockwise direction together with the radially-extending vane 43c. Anticlockwise rotation of small-diameter control-shaft portion 42a varies the pivot of oscillating motion of control link 40 such that the compression ratio is controlled or adjusted to a high compression ratio.

Under this condition, when the compression ratio has to be held at the high compression ratio, as shown in FIG. 4, directional control valve 105 is shifted from the rightmost valve shift position shown in FIG. 3 to an intermediate valve shift position, and at the same time shut-off valve 104 is fully closed. As appreciated from the graphical symbols of directional control valve 105, fluid communication between the ports e and d, in other words, fluid communication between the A chamber and oil pan 106 is blocked, while fluid communication between the ports c and f remains established, and thus the predetermined angular position of vane 43c as shown in FIG. 4 can be held.

Figure 5:
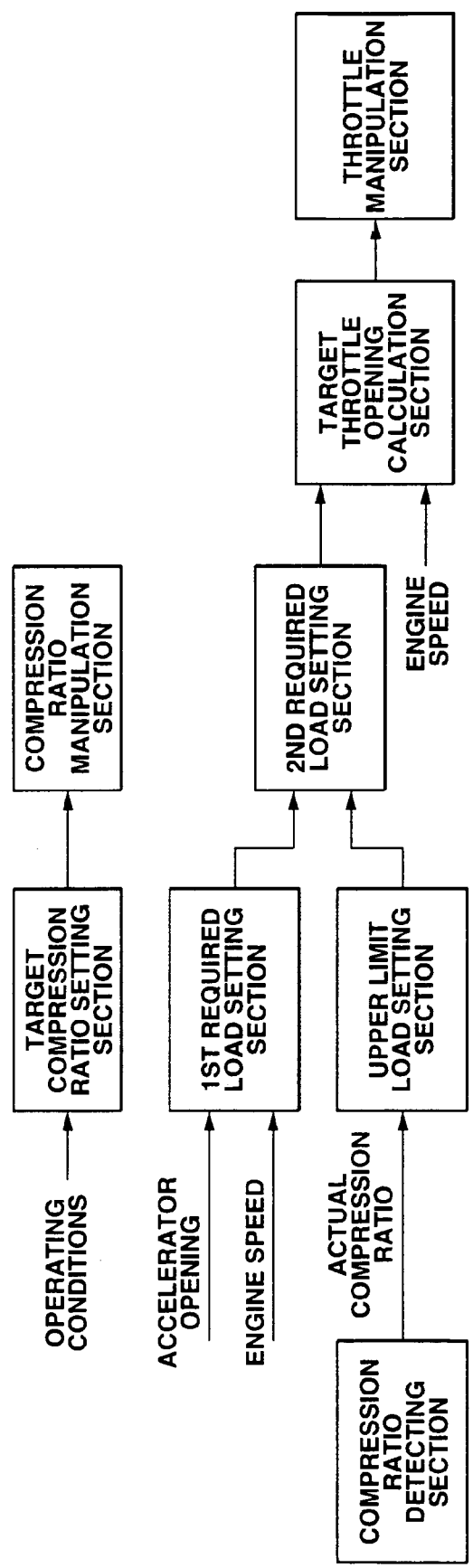
FIG. 5 is a control block diagram of an intake-air control system of the first embodiment.

Returning to FIG. 1, in addition to the variable compression ratio mechanism (the multi-link piston crank mechanism), the engine is also equipped with a turbocharger 51, which serves as a supercharging device that pressurizes the ingoing air-fuel mixture. In a conventional manner, turbocharger 51 is comprised of a turbine 52 located in an exhaust passage 54 and a compressor 53 located in an intake passage 55. Turbine 52 and compressor 53 are coaxially arranged with each other so that the turbocharger is driven by way of the engine exhaust gas. In order to control a boost pressure depending upon engine/vehicle operating conditions, an exhaust bypass valve 56c is provided such that part of exhaust gas in the exhaust passage upstream of turbine 52 is exhausted into the exhaust pipe, bypassing the turbine. In order to variably control the quantity of intake air drawn into the engine, a throttle valve 57 is disposed in intake passage 55 of an induction system and located downstream of compressor 53, for variably adjusting a quantity of intake air (fresh air) entering the engine cylinders. Throttle valve 57 is driven by means of a throttle actuator 58, such as a step motor, so that the throttle opening (or the angular position of throttle valve 57) is variably controlled. Throttle valve 57 and throttle actuator 58 construct an electronically-controlled throttle mechanism, which serves as a variable intake-air quantity mechanism or a variable fresh-air quantity mechanism. In order to send part of exhaust gas back through the engine by way of intake passage 55, an exhaust gas recirculation (EGR) passage 59 is disposed between exhaust passage 54 and intake passage 55. An exhaust gas recirculation control valve (simply, an EGR valve) 60 is disposed in EGR passage 59, for controlling the amount of exhaust gas recirculated, depending on the opening of EGR valve 60. In the shown embodiment, an electronically-controlled step-motor driven valve is used as the EGR valve. Throttle actuator 58 and EGR valve are controlled in response to respective control command signals from an electronic engine control unit (ECU) 67. ECU 67 generally comprises a microcomputer. ECU 67 includes an input/output interface (I/O), memories (RAM, ROM), and a microprocessor or a central processing unit (CPU). The input/output interface (I/O) of ECU 67 receives input information from various engine/vehicle sensors, namely an accelerator opening sensor 61, an engine speed sensor 62, a boost pressure sensor 63, a compression ratio sensor 64, an engine temperature sensor 65, and a knocking sensor 66. Accelerator opening sensor 61 is provided to detect or monitor an accelerator opening Acc of the accelerator manually operated by the driver. Engine speed sensor 62 is provided to detect engine speed Ne. Boost pressure sensor 63 is provided to detect a boost pressure in the intake system upstream of throttle valve 57. Compression ratio sensor 64 is provided to detect an actual compression ratio $\epsilon$. Engine temperature sensor 65 is provided to detect engine temperature such as engine coolant temperature. Knocking sensor (or detonation sensor) 66 is usually screwed into the cylinder block in the vicinity of the engine cylinder to detect knocking or engine-cylinder ignition knock (heavy metallic sound created in the engine). Within ECU 67, the central processing unit (CPU) allows the access by the I/O interface of input informational data signals from the previously-discussed engine/vehicle sensors 61–66. The CPU of ECU 67 is responsible for carrying the control program stored in memories and is capable of performing necessary arithmetic and logic operations containing engine control management processing containing electronic throttle opening control, in other words, electronic intake-air quantity control, achieved through throttle actuator 58, and automatic EGR control achieved through EGR valve 60. Computational results (arithmetic calculation results), that is, calculated output signals are relayed through the output interface circuitry of ECU 67 to output stages, namely throttle actuator 58 included in an engine output control system (an intake-air quantity control system), and EGR valve 60 included in an EGR control system. Although it is not clearly shown in the drawings, in addition to the throttle opening control (the intake-air quantity control) and the EGR control, ECU 67 also performs the other controls, that is, fuel-injection control achieved by an electronic fuel-injection system and ignition timing control achieved by an electronic ignition system. ECU 67 also performs the compression ratio control achieved by the previously-discussed variable compression ratio mechanism. Actually, the throttle opening control of throttle valve 57, in other words, the intake-air quantity control is executed on the basis of the actual compression ratio, as discussed hereunder in reference to the block diagram shown in FIG. 5 and the flow charts shown in FIGS. 6, 7, and 12.

Figure 6:
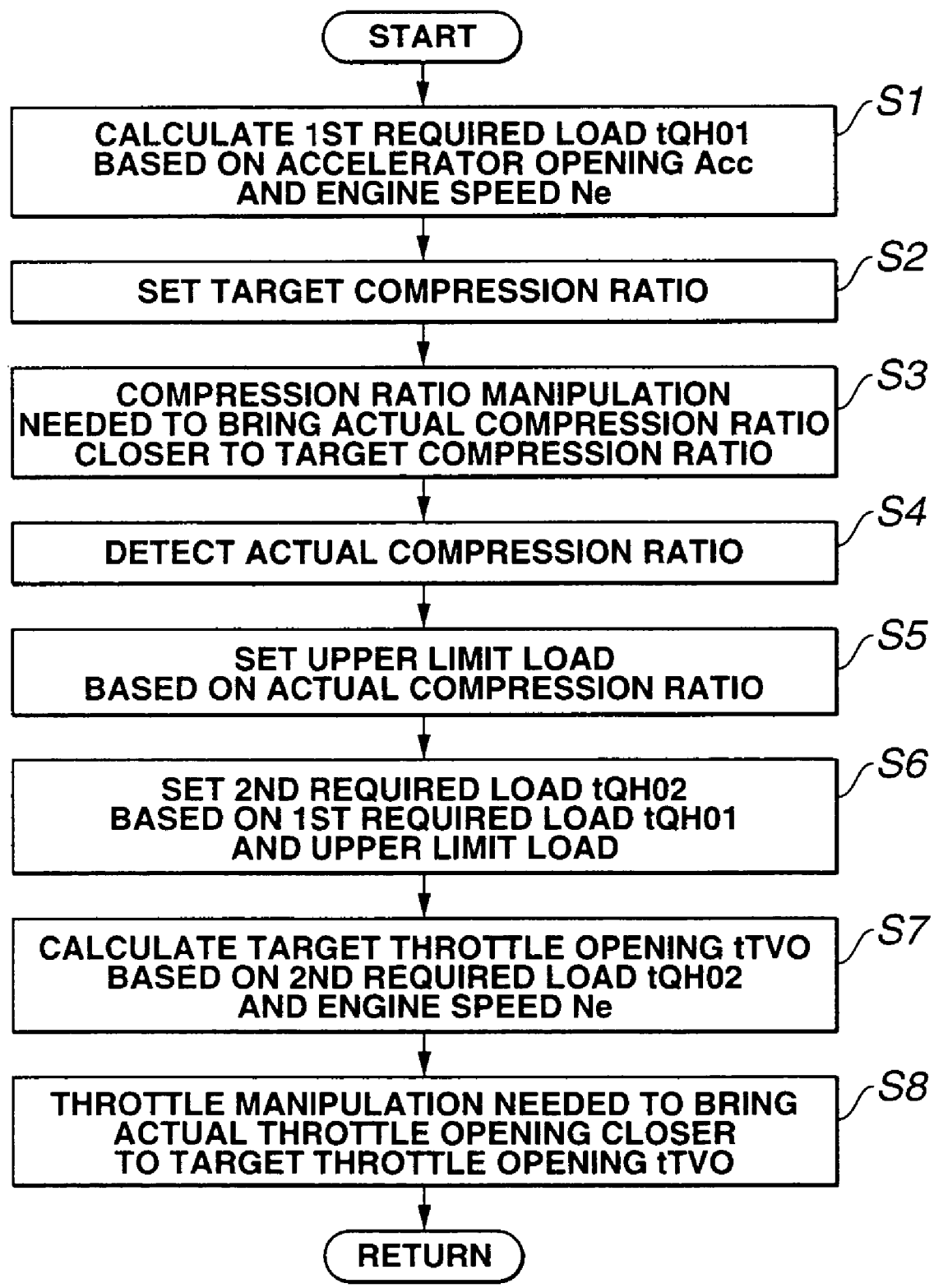
FIG. 6 is a main flow chart relating to the control block diagram of the system of the first embodiment of FIG. 5.
Figure 7:
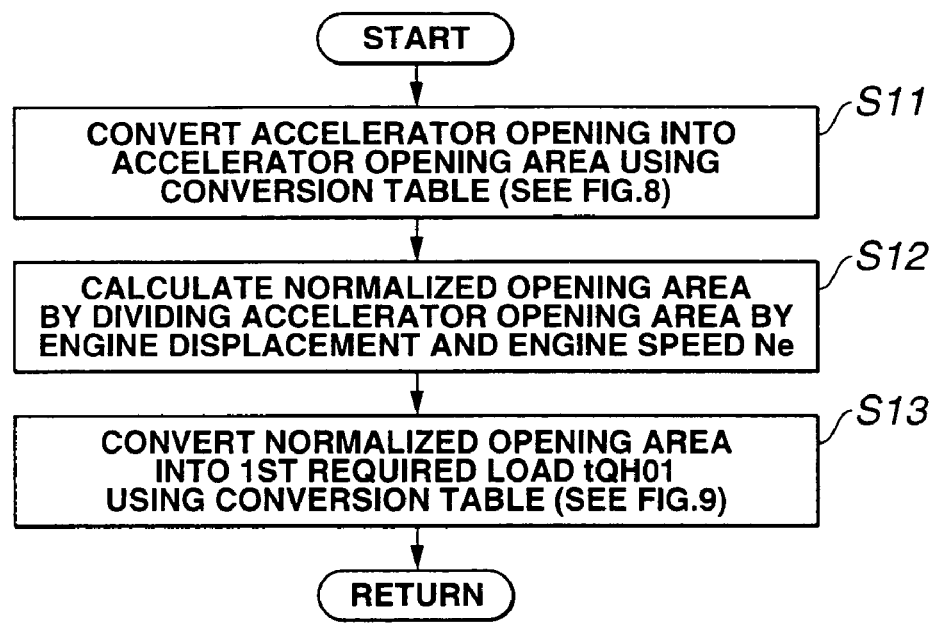
FIG. 7 is a sub flow chart relating to the control block diagram of the system of the first embodiment of FIG. 5 and corresponding to step S1 of FIG. 6.
Figure 8:
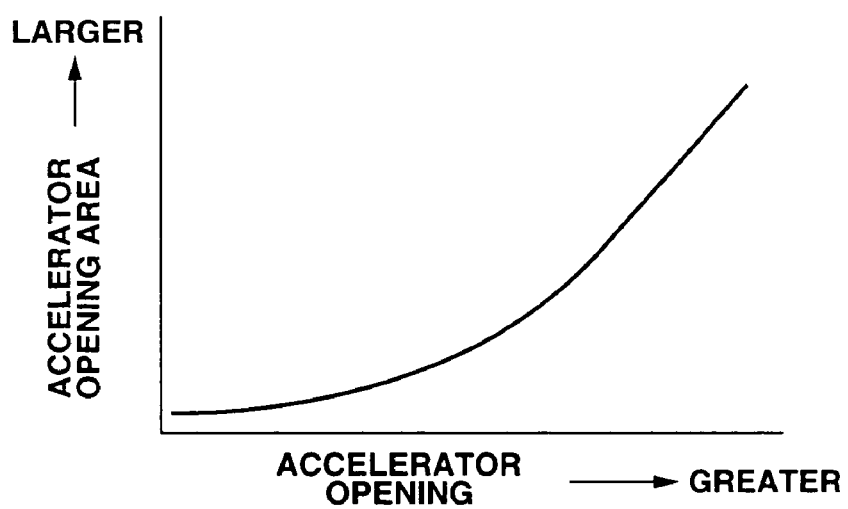
FIG. 8 is a predetermined conversion table needed to convert an accelerator opening Acc into an accelerator opening area.
Figure 9:
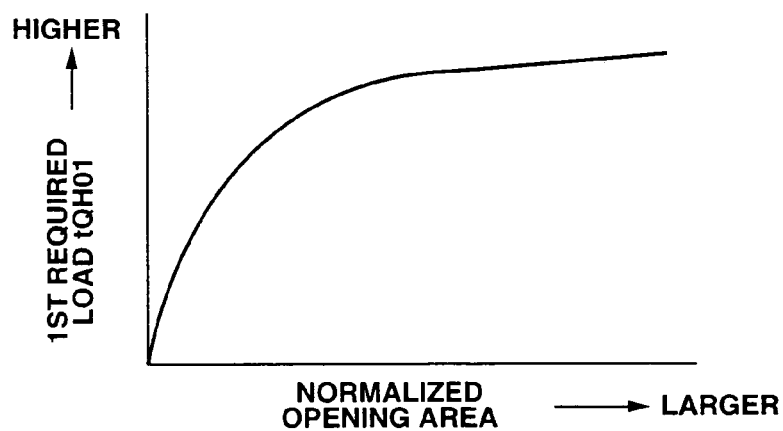
FIG. 9 is a predetermined conversion table needed to convert a normalized opening area into a first required load tQH01.

First, at step S1 of FIG. 6, first required load tQH01 is calculated or computed or determined based on accelerator opening Acc and engine speed Ne, in accordance with the sub flow chart shown in FIG. 7. Concretely, as can be seen from the sub flow chart of FIG. 7, at step S11 of FIG. 7, accelerator opening Acc is converted into an accelerator opening area, utilizing the predetermined conversion table of FIG. 8. At step S12 of FIG. 7, a normalized opening area is arithmetically calculated by dividing the accelerator opening area by the product (Ve×Ne) of an engine displacement Ve and engine speed Ne. Thereafter, at step S13 of FIG. 7, first required load tQH01 is calculated or determined or retrieved based on the normalized opening area from the predetermined conversion table of FIG. 9 showing how first required load tQH01 has to be varied relative to the normalized opening area.

Figure 10:
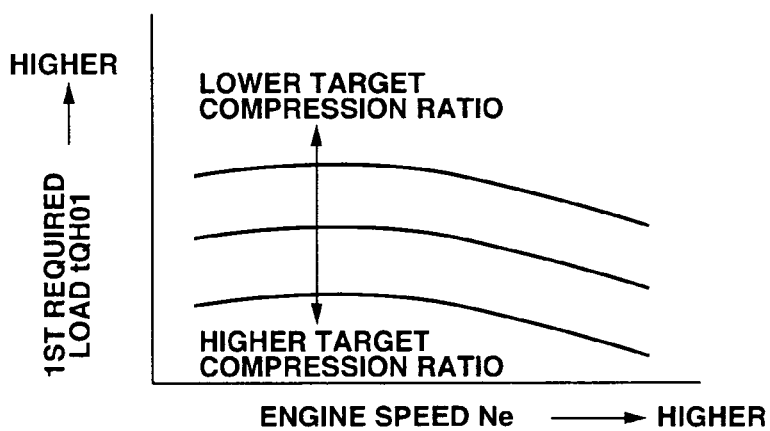
FIG. 10 is a predetermined characteristic map needed to determine a target compression ratio based on the first required load tQH01 and engine speed Ne.

At step S2, a target compression ratio is calculated or retrieved based on first required load tQH01 and engine speed Ne from the predetermined characteristic map showing how the target compression ratio has to be varied relative to first required load tQH01 and engine speed Ne. As can be seen from the preprogrammed characteristic map of FIG. 10, on the one hand, the higher the first required load tQH01, the lower the target compression ratio. This is because there is an increased tendency of engine knocking, owing to an increase in first required load tQH01. On the other hand, in a high engine speed range, the target compression ratio is set to a somewhat higher compression ratio, since a charging efficiency tends to reduce in the high engine speed range.

At step S3, the variable compression ratio mechanism is manipulated or feedback-controlled to bring actual compression ratio $\epsilon$ closer to the target compression ratio, determined or set through step S2.

At step S4, actual compression ratio $\epsilon$, which is detected by compression ratio sensor 64, is read.

Figure 11:
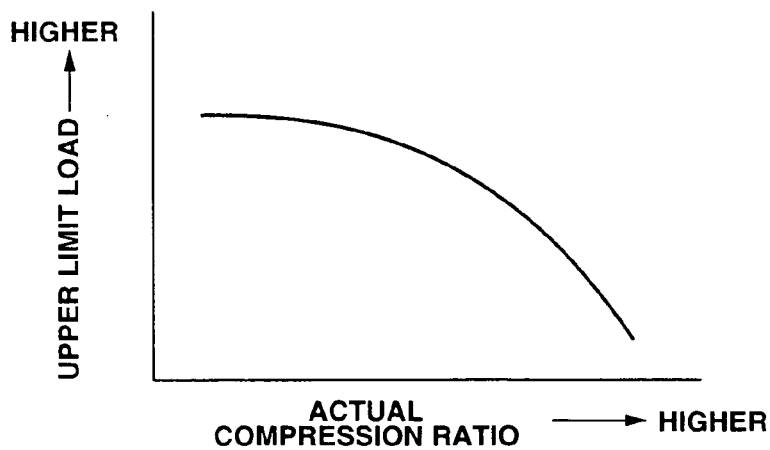
FIG. 11 is a predetermined characteristic map needed to determine an upper limit load $tQH_{LIMIT}$ based on an actual compression ratio $\epsilon$.

At step S5, upper limit load $tQH_{LIMIT}$ is calculated or retrieved based on actual compression ratio $\epsilon$, from the predetermined $\epsilon$-$tQH_{LIMIT}$ characteristic map of FIG. 11 showing how upper limit load $tQH_{LIMIT}$ has to be varied relative to actual compression ratio $\epsilon$. As is generally known, the engine-knocking tendency increases, as the compression ratio becomes higher. For knocking avoidance, upper limit load $tQH_{LIMIT}$ is thus set to a lower value in accordance with an increase in actual compression ratio $\epsilon$.

At step S6, a lower one of first required load tQH01 and upper limit load $tQH_{LIMIT}$ is determined or selected as second required load tQH02 by way of a so-called select-LOW process $tQH02=\min(tQH01, tQH_{LIMIT})$.

Figure 12:
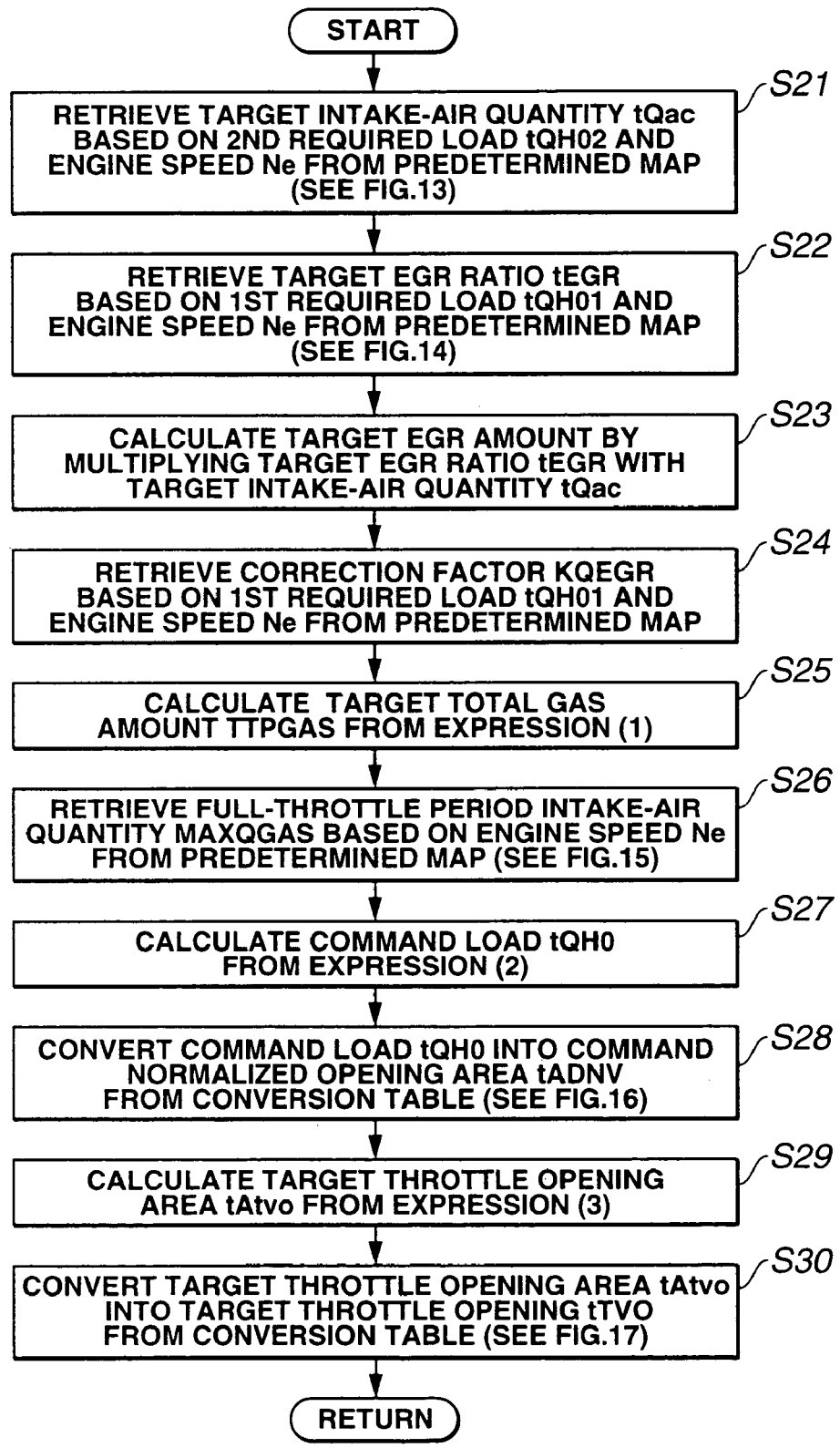
FIG. 12 is a sub flow chart needed to calculate a target throttle opening tTVO based on a second required load tQH02 and engine speed Ne.

At step S7, target throttle opening tTVO is calculated based on second required load tQH02 and engine speed Ne in accordance with the sub flow chart shown in FIG. 12.

Figure 13:
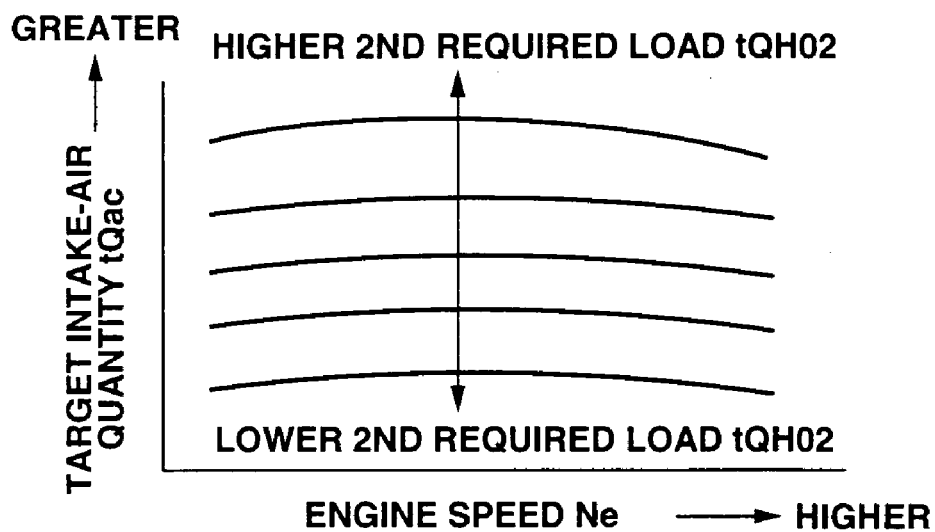
FIG. 13 is a predetermined characteristic map needed to determine a target intake-air quantity tQac based on the second required load tQH02 and engine speed Ne.

Concretely, as can be seen from the sub flow chart of FIG. 12, at step S21, target intake-air quantity (target intake-air mass flow rate) tQac is calculated or retrieved based on second required load tQH02 and engine speed Ne from the preprogrammed Ne-tQH02-tQac characteristic map of FIG. 13, showing how target intake-air quantity tQac has to be varied relative to engine speed Ne and second required load tQH02.

Figure 14:
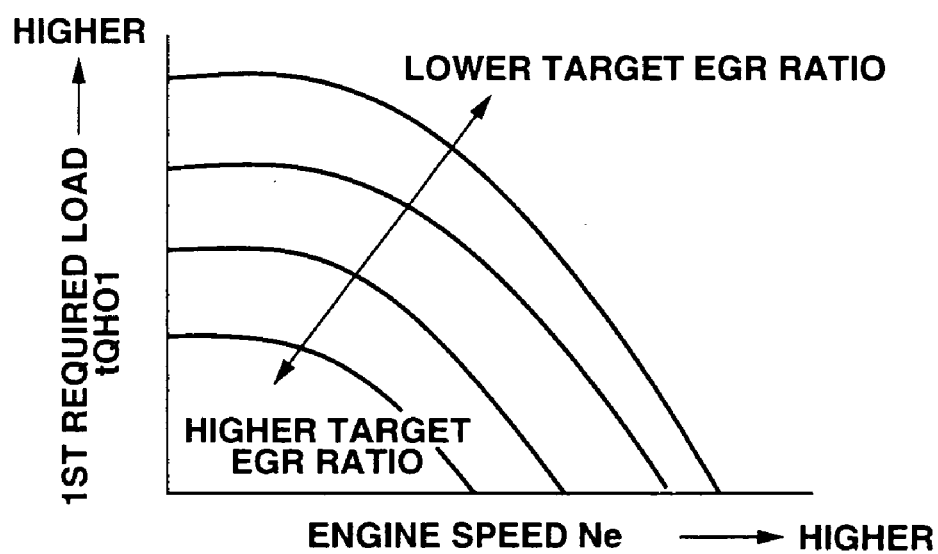
FIG. 14 is a predetermined characteristic map needed to determine a target EGR ratio tEGR based on the first required load tQH01 and engine speed Ne.

At step S22, target EGR ratio tEGR is calculated or retrieved based on first required load tQH01 and engine speed Ne from the preprogrammed characteristic map of FIG. 14 showing how target EGR ratio tEGR has to be varied relative to first required load tQH01 and engine speed Ne. Target EGR ratio tEGR is defined as a ratio of the target EGR amount (the target EGR mass flow rate) to target intake-air quantity tQac.

At step S23, the target EGR amount (the target EGR mass flow rate) is arithmetically calculated by multiplying target EGR ratio tEGR with target intake-air quantity tQac.

At step S24, a correction factor (or a conversion factor) KQEGR is calculated or retrieved based on first required load tQH01 and engine speed Ne from a predetermined or preprogrammed characteristic map. Correction factor (conversion factor) KQEGR is utilized to convert the target EGR amount (the target EGR mass flow rate calculated through step S23), into an intake-air quantity (a quantity of fresh air). Generally, physical properties and states for exhaust gas recirculated (EGR) can be determined or estimated based on first required load tQH01 and engine speed Ne. More exactly, correction factor KQEGR is used to convert the target EGR amount-(the target EGR mass flow rate) into the fresh-air quantity (the fresh-air volumetric flow rate) given on the assumption that fresh air flows through the same opening area that the target EGR amount passes through the EGR valve opening area. By virtue of such conversion, it is possible to easily precisely calculate or estimate or determine the throttle opening and the EGR valve opening, even during EGR addition.

At step S25, a target total gas amount (a target total gas volumetric flow rate) TTPGAS is calculated based on target intake-air quantity tQac, target EGR ratio tEGR, and correction factor KQEGR, from the following expression (1).

$$TTPGAS=(tQac \times Pa/Pcom)+[(tEGR/100) \times tQac \times KQEGR] \quad (1)$$

where tQac denotes the target intake-air quantity (the target intake-air mass flow rate), Pa denotes an atmospheric pressure, Pcom denotes a pressure in the intake system upstream of the throttle valve, in other words, the boost pressure, tEGR denotes the target EGR ratio (unit: %), and KQEGR denotes the correction factor (the conversion factor).

Figure 15:
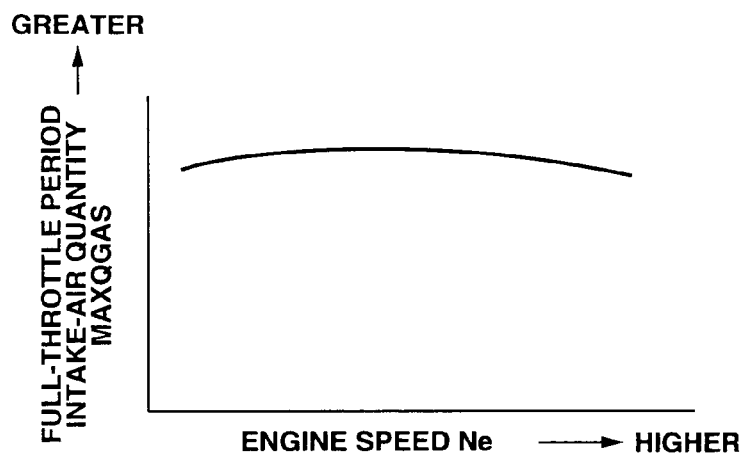
FIG. 15 is a predetermined characteristic map needed to determine a full-throttle period intake-air quantity MAXQGAS based on engine speed Ne.

At step S26, full-throttle period intake-air quantity (full-throttle period intake-air volumetric flow rate) MAXQGAS is calculated or retrieved based on engine speed Ne from the preprogrammed Ne-MAXQGAS characteristic map of FIG. 15 showing how full-throttle period intake-air quantity MAXQGAS has to be varied relative to engine speed Ne.

At step S27, command load tQH0 is arithmetically calculated based on target total gas amount (target total gas volumetric flow rate) TTPGAS and full-throttle period intake-air quantity (full-throttle period intake-air volumetric flow rate) MAXQGAS, from the following expression (2).

$$tQH0=TTPGAS \times MAXQGAS \quad (2)$$

Figure 16:
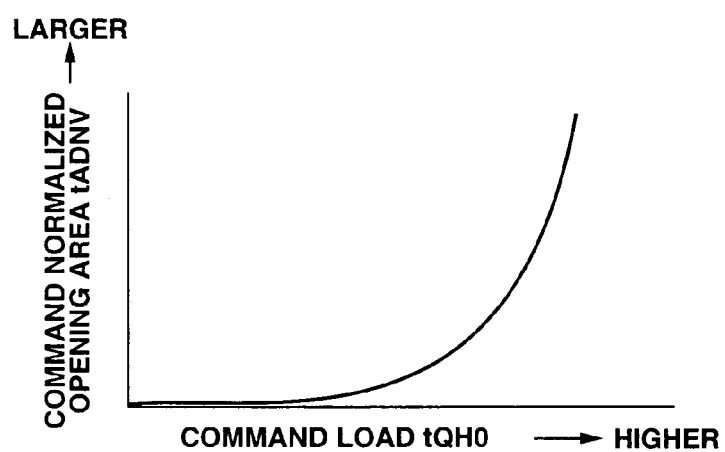
FIG. 16 is a predetermined conversion table needed to determine a command normalized opening area tADNV based on a command load tQH0.

At step S28, command normalized opening area tADNV is calculated or retrieved based on command load tQH0 from the preprogrammed tQH0-tADNV conversion table of FIG. 16 showing how command load tQH0 has to be converted into command normalized opening area tADNV.

At step S29, target throttle opening area tAtvo is arithmetically calculated based on command normalized opening area tADNV and engine speed Ne from the following expression (3)

$$tAtvo=tADNV \times Ve \times Ne \quad (3)$$

where tADNV denotes the command normalized opening area, Ve denotes the engine displacement, and Ne denotes the engine speed.

Figure 17:
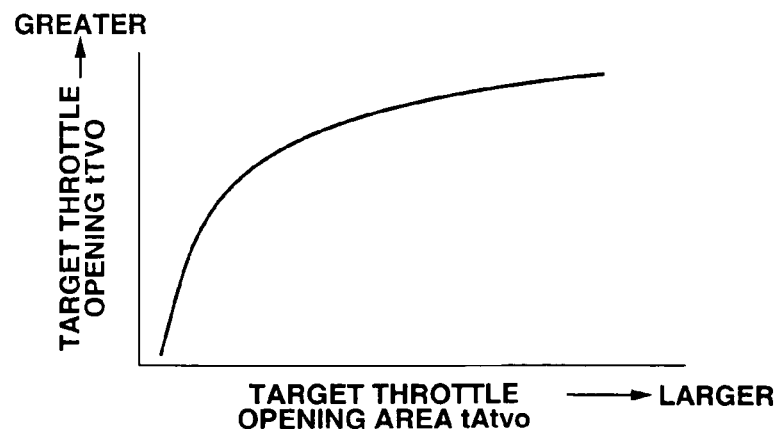
FIG. 17 is a predetermined conversion table needed to convert a target throttle opening area tAtvo into target throttle opening tTVO.

At step S30 of FIG. 12, target throttle opening area tAtvo is converted into target throttle opening tTVO by the preprogrammed tAtvo-tTVO conversion table of FIG. 17.

Returning to step S8 of FIG. 6, throttle actuator 58 is manipulated or feedback-controlled to bring the actual throttle opening to target throttle opening tTVO determined based on second required load tQH02 and engine speed Ne.

Referring now to FIGS. 18A–18C, there are shown the time charts explaining the operation and effects of the system of the first embodiment during an accelerating condition.

As can be seen from the time charts shown in FIGS. 18A–18C, at early stages of vehicle acceleration first required load tQH01 tends to rise in synchronism of an increase in accelerator opening Acc. On the other hand, second required load tQH02 is limited by upper limit load $tQH_{LIMIT}$, and thus an increase in target throttle opening tTVO is effectively limited or suppressed by way of second required load tQH02. As a result of this, an increase in the intake-air quantity (the fresh-air quantity) tends to retard. Thus, it is possible to properly optimally match (i) a time change in the quantity of intake air (fresh air) drawn into the engine, that is, an intake-air-quantity increase (a response characteristic of the intake-air-quantity control system) with (ii) a time change in the actual compression ratio, which tends to vary with a time lag with respect to the target compression ratio (see FIG. 18B), that is, an actual-compression-ratio drop (a response characteristic of the compression-ratio control system). That is, according to the system of the first embodiment, it is possible to efficiently accelerate the vehicle while effectively suppressing engine knock from occurring even during the accelerating condition.

Figure 19:
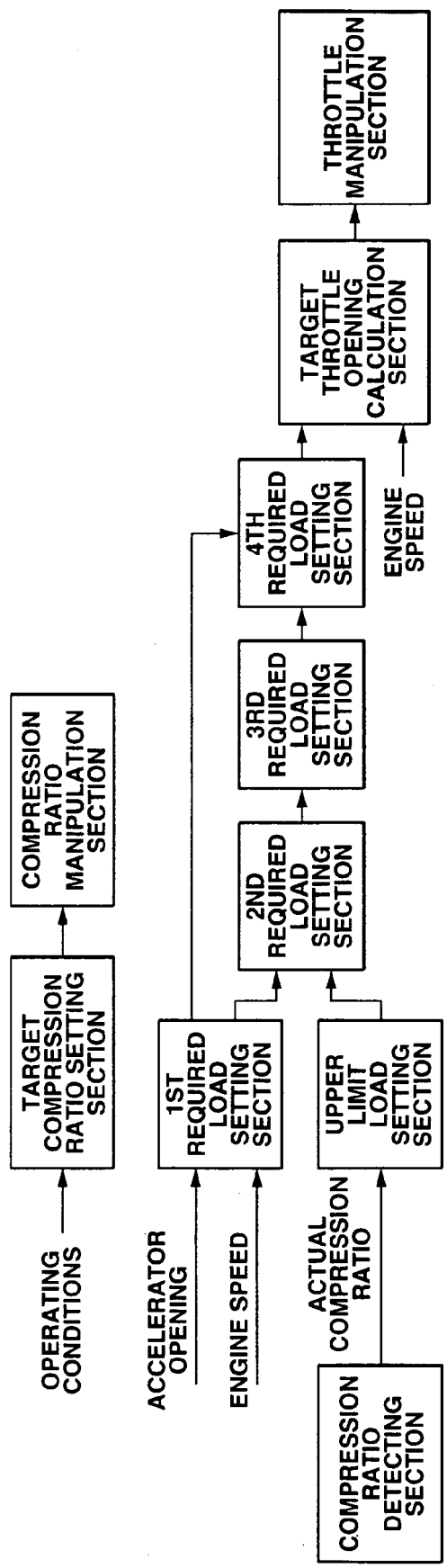
FIG. 19 is a control block diagram of an intake-air control system of the second embodiment.

Referring now to FIG. 19, there is shown the control block diagram of the system of the second embodiment. The throttle opening control, that is, the intake-air quantity control executed by the system of the second embodiment is hereinafter described in detail in reference to the main flow chart of FIG. 20.

Figure 20:
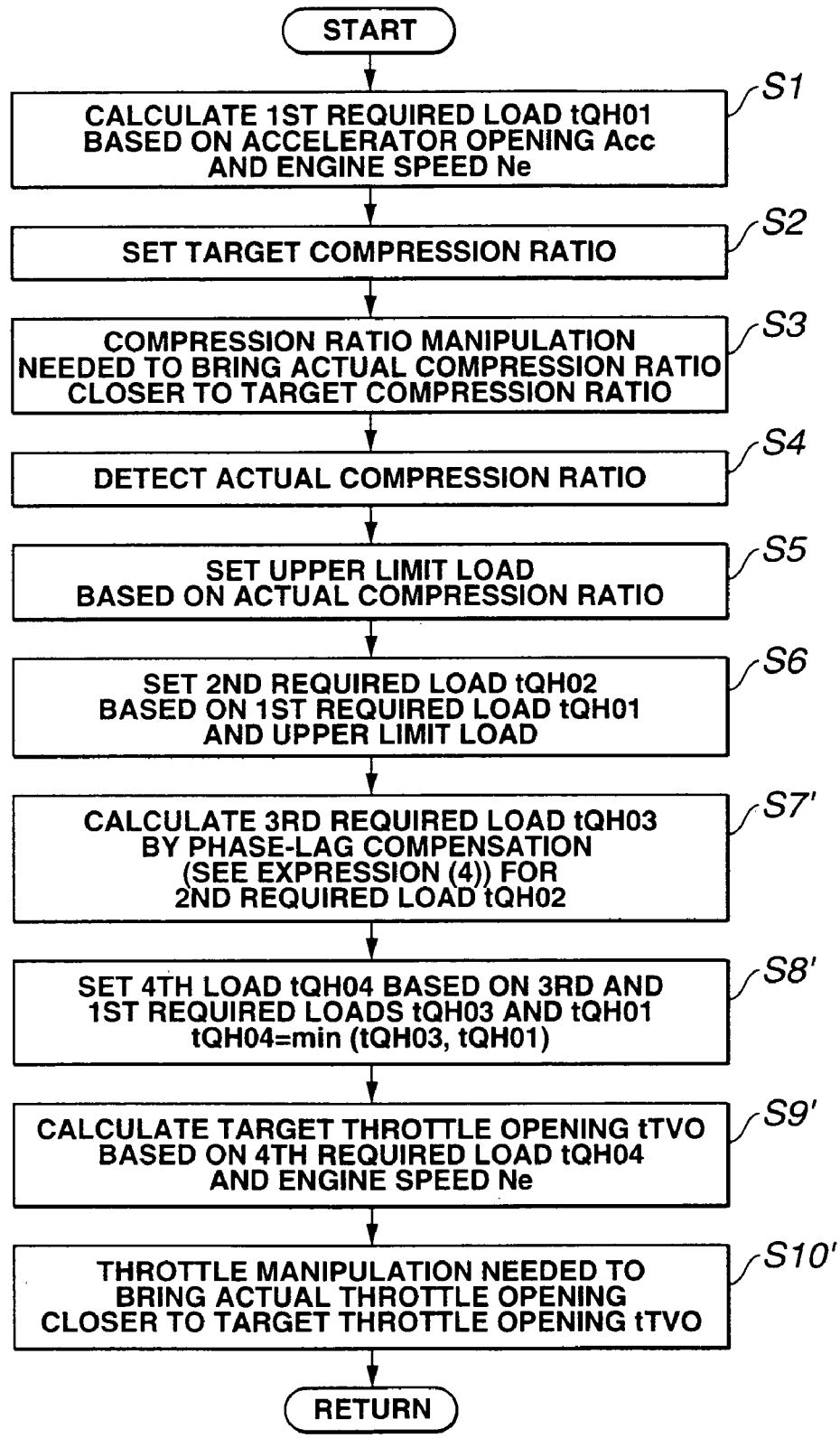
FIG. 20 is a main flow chart relating to the control block diagram of the system of the second embodiment of FIG. 19.

As can be appreciated from comparison between the two flow charts of FIGS. 6 and 20, the modified arithmetic processing executed by the system of the second embodiment (FIG. 20) is similar to that of the first embodiment (FIG. 6), except that steps S7–S8 included in the routine shown in FIG. 6 are replaced with steps S7', S8', S9' and S10' included in the routine shown in FIG. 20. Thus, the same step numbers used to designate steps in the routine shown in FIG. 6 will be applied to the corresponding step numbers used in the modified arithmetic processing shown in FIG. 20, for the purpose of comparison of the two different interrupt routines. Steps S7'–S10' will be hereinafter described in detail with reference to the accompanying drawings, while detailed description of steps S1–S6 will be omitted because the above description thereon seems to be self-explanatory.

At step S7', a phase-lag compensation is made to second required load tQH02 so as to produce third required load tQH03. That is to say, third required load (phase-lag compensated load) tQH03 is calculated or determined based on second required load tQH02 from the following transfer function.

$$tQH03=[(1+\tau pcS)/(1+\tau cS)] \cdot tQH02$$

where τpc denotes a response-delay time constant for an intake-air quantity (fresh-air quantity) detector of an intake-system collector portion when charging fresh air into the collector, τc denotes a phase-lead time constant of the intake-system collector portion relative to the engine cylinder portion, and S denotes a Laplacean.

The previously-noted response-delay time constant τpc may be fixed to a constant. In lieu thereof, response-delay time constant τpc may be a variable. In case of the variable response-delay time constant τpc, for instance, it is preferable to derive response-delay time constant τpc as a function f(Ne) of engine speed Ne. The use of the variable response-delay time constant τpc calculated as the function τpc=f(Ne), insures a high accuracy of the intake-air quantity control system. On the other hand, in the shown embodiment, phase-lead time constant τc of the intake-system collector portion relative to the engine cylinder portion, is predetermined as a fixed value.

The following expression (4) is obtained by making an inverse Laplace transform to the previously-discussed transfer function.

$$(\tau c+\Delta t/2) \cdot tQH03-(\tau c-\Delta t/2) \cdot z^{-1}tQH03=tQH02-(\tau pc-\Delta t/2) \cdot z^{-1}tQH02 \rightarrow tQH03=[(\tau c-\Delta t/2) \cdot z^{-1}tQH03+(\tau pc+\Delta t/2) \cdot tQH02-(\tau pc-\Delta t/2) \cdot z^{-1}tQH02]/(\tau c+\Delta t/2) \quad (4)$$

where Δt denotes a predetermined sampling time interval (unit: seconds).

At step S8', a lower one of the previously-discussed phase-lag compensated, third required load tQH03 and first required load tQH01 is selected as a fourth required load tQH04 by way of a so-called select-LOW process tQH04=min(tQH03, tQH01), so as to prevent the calculated required load, in other words, the calculated intake-air quantity from exceeding the driver's required engine load, while maintaining engine load within a required load less than and closer to the driver's required load.

At step S9', target throttle opening tTVO is calculated based on fourth required load tQH04 and engine speed Ne in accordance with a series of procedures similar to the sub flow chart shown in FIG. 12.

At step S10', throttle actuator 58 is manipulated or feedback-controlled to bring the actual throttle opening to target throttle opening tTVO determined based on fourth required load tQH04 and engine speed Ne.

As previously described, in case of the system of the first embodiment (see FIGS. 5 and 6) not executing any phase-lag compensation, although the actual intake-air quantity does not yet reach an intake-air quantity corresponding to upper limit load tQH$_{LIMIT}$ owing to a phase lag, there is an increased tendency for the calculated, phase-lag-uncompensated intake-air quantity to exceed upper limit load tQH$_{LIMIT}$. In such a case, an unnecessary limitation on the engine load may take place. On the contrary, in case of the system of the second embodiment (see FIGS. 19 and 20) capable of executing the phase-lag compensation (see step S7' of FIG. 20) discussed above, fourth required load tQH04 can be further derived or calculated as the lower one {min(tQH03, tQH01)} of first required load tQH01 and third required load (phase-lag compensated required load) tQH03. Therefore, the system of the second embodiment can realize high load operation closer to the driver's required engine load, while effectively suppressing undesirable engine knocking from occurring even in transient maneuvers such as during the vehicle's accelerating condition. This enhances the acceleration performance, while avoiding knocking even during vehicle acceleration.

Figure 21:
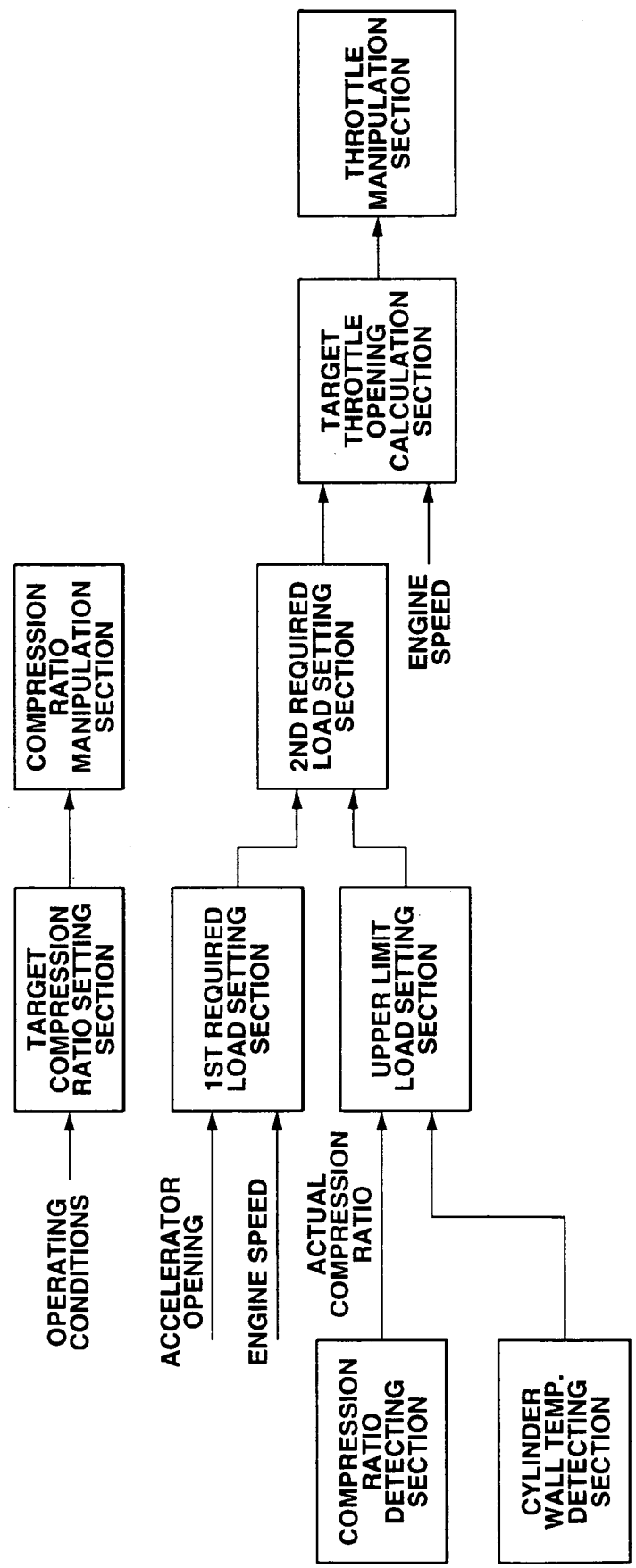
FIG. 21 is a control block diagram of an intake-air control system of the third embodiment.
Figure 22:
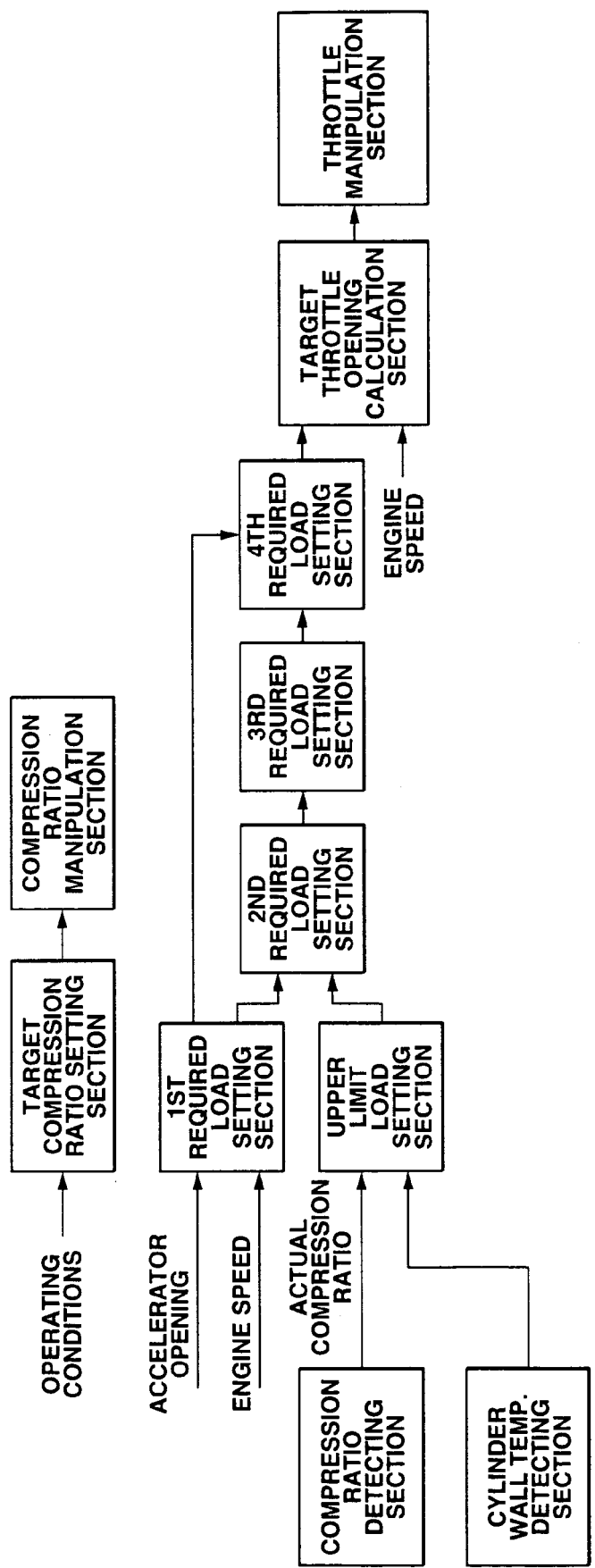
FIG. 22 is a control block diagram of an intake-air control system of the fourth embodiment.
Figure 23:
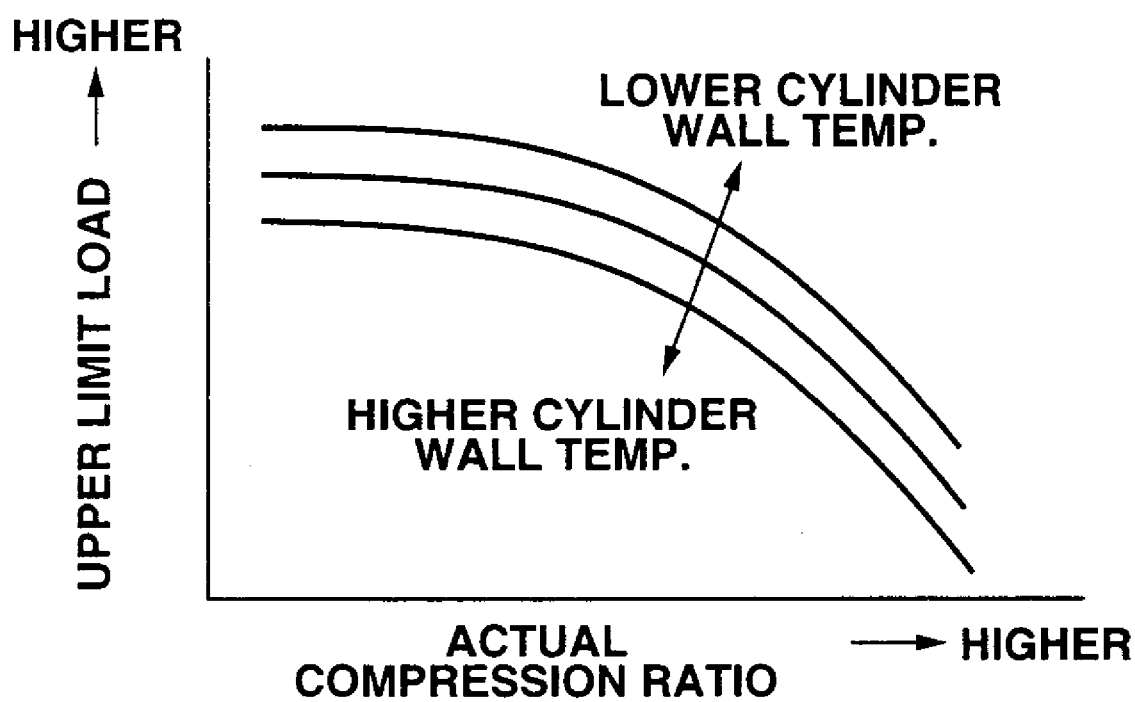
FIG. 23 is a predetermined characteristic map needed to determine an upper limit load $tQH_{LIMIT}$ based on actual compression ratio $\epsilon$ and cylinder wall temperature $T_{CYL}$.

FIGS. 21 and 22 show the control block diagrams of the systems of the third and fourth embodiments. As can be appreciated from comparison between the control block diagrams shown in FIGS. 5 and 21, the system of the third embodiment of FIG. 21 is similar to that of the first embodiment (FIG. 5), except that the system of the third embodiment (FIG. 21) utilizes cylinder wall temperature T$_{CYL}$ as well as actual compression ratio ε to calculate or estimate upper limit load tQH$_{LIMIT}$ (see the cylinder wall temperature detecting section of the block diagram shown in FIG. 21 and the predetermined ε-T$_{CYL}$-tQH$_{LIMIT}$ characteristic map shown in FIG. 23). In a similar manner, as can be appreciated from comparison between the control block diagrams shown in FIGS. 19 and 22, the system of the fourth embodiment of FIG. 22 is similar to that of the second embodiment (FIG. 19), except that the system of the fourth embodiment (FIG. 22) utilizes cylinder wall temperature T$_{CYL}$ as well as actual compression ratio ε to calculate or estimate upper limit load tQH$_{LIMIT}$ (see the cylinder wall temperature detecting section of the block diagram shown in FIG. 22 and the predetermined ε-T$_{CYL}$-tQH$_{LIMIT}$ characteristic map shown in FIG. 23). As is generally known, the higher the cylinder wall temperature T$_{CYL}$, the higher the temperature of air/fuel mixture on the compression stroke, thus increasing a possibility of occurrence of engine knocking. For this reason, upper limit load tQH$_{LIMIT}$ has to be decreasingly compensated for in accordance with a rise in cylinder wall temperature T$_{CYL}$. As a matter of course, increasing the actual compression ratio ε means an increase in the possibility of engine knock. Thus, upper limit load tQH$_{LIMIT}$ has to be also reduced in accordance with an increase in actual compression ratio ε. For instance, cylinder wall temperature T$_{CYL}$ can be accurately directly detected by means of a cylinder wall temperature sensor, which is screwed into the engine cylinder block. In lieu thereof, cylinder wall temperature T$_{CYL}$ may be indirectly estimated from engine temperature detected by engine temperature sensor 65, which is usually screwed into one of engine coolant passages.

As set forth above, according to the systems of the third and fourth embodiments shown in FIGS. 21 and 22, upper limit load tQH$_{LIMIT}$ can be more exactly derived or calculated or set, taking into account cylinder wall temperature T$_{CYL}$ as well as actual compression ratio ε, thus enabling high load operation as close to the driver's required load as possible, while effectively certainly avoiding or suppressing undesirable engine knock from occurring even in transient maneuvers such as during the vehicle's accelerating condition. This enhances the acceleration performance, while avoiding engine knock even during vehicle acceleration.

In the intake-air control systems of the first (FIGS. 5–7), second (FIGS. 19–20), third (FIG. 21), and fourth (FIG. 22) embodiments, an electronically-controlled throttle mechanism, which is constructed by throttle valve 57 and throttle actuator 58, is used as a variable intake-air quantity mechanism. Instead of using such an electronically-controlled throttle mechanism, a variable intake valve lift characteristic control mechanism or a variable intake valve characteristic control mechanism, which is capable of variably controlling a intake-valve characteristic such as an intake-valve working angle, in other words, an intake-valve open period (i.e., an intake-valve open timing and/or an intake-valve closure timing), and/or a phase of the intake valve (an angular phase at the maximum intake-valve lift point), may be used as a variable intake-air quantity mechanism. Alternatively, both of the electronically-controlled throttle mechanism and the variable intake valve characteristic control mechanism may be used as a variable intake-air quantity mechanism.

In the systems of the shown embodiments, a multi-link piston crank mechanism is used as a variable compression ratio mechanism capable of varying a piston stroke characteristic containing the TDC and BDC positions of the reciprocating piston, and a hydraulically-operated vane type actuator is used as compression-ratio control actuator 43. By means of an electric motor, the variable compression ratio mechanism may be electrically- rather than hydraulically-driven. In the same manner as the hydraulically-operated actuator, when adjusting to the desired compression ratio, the motor-driven actuator has to produce a great driving torque required for moving the variable compression ratio mechanism from the initial position against great internal combustion in the combustion chamber and for varying the attitude of the variable compression ratio mechanism. For this reason, the motor-driven actuator employs a reduction gear box having a comparatively great reduction ratio. In a manner similar to the hydraulically-operated actuator, such a reduction-gear equipped motor-driven actuator has a relatively great response delay, and therefore the change in the compression ratio controlled by the variable compression ratio mechanism tend to occur slower than the change in intake-air quantity. Thus, the concept of the present invention can be effectively applied to an engine equipped with a motor-driven variable compression ratio mechanism. As described previously, in the shown embodiments, the multi-link piston crank mechanism is used as the variable compression ratio mechanism. Such a multi-link piston crank mechanism ensures the high-precision compression ratio control, but requires a comparatively great driving torque. In other words, the multi-link piston crank mechanism itself has a relatively great mechanical response delay. For the reasons discussed above, the concept of the present invention can be effectively applied to an engine with a multi-link piston crank mechanism serving as a variable compression ratio mechanism, in a manner so as to ensure optimal matching between variable intake-air quantity control and variable compression ratio control.

As will be appreciated from the above, in the systems of the first and third embodiments, actual compression ratio $\epsilon$ is controlled based on engine operating conditions, while first required load tQH01, which is determined or set based on the engine operating conditions, is properly limited by upper limit load $tQH_{LIMIT}$, which is determined or set based on actual compression ratio $\epsilon$ so as to produce the limited load, that is, second required load tQH02=min(tQH01, $tQH_{LIMIT}$). Then, in order to satisfy second required load tQH02, the variable intake-air quantity mechanism, such as the electronically-controlled throttle mechanism, is controlled. Therefore, the upper limit of the intake-air quantity is properly limited or compensated for in such a manner as to match a delay of the reduction in actual compression ratio $\epsilon$, thus enhancing the acceleration performance while effectively avoiding combustion chamber knock.

Additionally, in the systems of the second and fourth embodiments, a predetermined phase-lag compensation is made to second required load tQH02 to determine or derive third required load (phase-lag compensated load) tQH03= $[(1+\tau pcS)/(1+\tau cS)] \cdot tQH02$. Thereafter, fourth required load tQH04 is determined as the lower one of third required load tQH03 and first required load tQH01, that is, tQH04=min (tQH03, tQH01). Then, in order to satisfy fourth required load tQH04, the variable intake-air quantity mechanism is controlled. As a result, it is possible to prevent the intake-air quantity from being excessively limited or reduced to a considerable extent corresponding to a time delay (a collector charging time) required to adequately charge the interior space of the collector with fresh air. Thus, the systems of the second and fourth embodiments can realize high load operation closer to the driver's required engine load, effectively suppressing undesirable combustion chamber knock from occurring even in transient maneuvers such as during the vehicle's accelerating condition, thereby enhancing the acceleration performance, while avoiding combustion knock even during vehicle acceleration.

In the shown embodiments, upper limit load $tQH_{LIMIT}$ is determined to gradually decrease, as actual compression ratio $\epsilon$ increases, in other words, knocking tendencies increase. That is, upper limit load $tQH_{LIMIT}$ can be exactly determined depending on the knocking tendencies, thus properly limiting the intake-air quantity.

Moreover, in the systems of the third and fourth embodiments, upper limit load $tQH_{LIMIT}$ can be determined, taking into account cylinder wall temperature $T_{CYL}$ as well as actual compression ratio $\epsilon$. These factors $T_{CYL}$ and $\epsilon$ are closely related with combustion-chamber knocking tendencies. According to the systems of the third and fourth embodiments, upper limit load $tQH_{LIMIT}$ is gradually decreasingly compensated for, as cylinder wall temperature $T_{CYL}$ rises. Thus, upper limit load $tQH_{LIMIT}$ can be more precisely determined depending on the knocking tendencies, thus more properly limiting the intake-air quantity.

The entire contents of Japanese Patent Application No. 2002-364373 (filed Dec. 16, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An intake-air control system for an engine employing a variable intake-air quantity mechanism that variably controls a quantity of fresh air entering the engine and a variable compression ratio mechanism that variably controls a compression ratio of the engine, comprising:

sensor means for detecting engine operating conditions and the compression ratio; and control means configured to be electronically connected to the sensor means, the variable intake-air quantity mechanism, and the variable compression ratio mechanism for controlling the variable intake-air quantity mechanism based on the compression ratio as well as the engine operating conditions;

the control means comprising:
- (a) a first required load setting means for setting a first required load based on the engine operating conditions;
- (b) an upper limit load setting means for setting an upper limit load based on the compression ratio; and
- (c) a second required load setting means for setting a second required load by limiting the first required load by the upper limit load, wherein the control means controls the variable intake-air quantity mechanism to satisfy the second required load, while controlling the compression ratio based on the engine operating conditions by the variable compression ratio mechanism.

2. An intake-air control system for an engine employing a variable intake-air quantity mechanism that variably controls a quantity of fresh air entering the engine and a variable compression ratio mechanism that variably controls a compression ratio of the engine, comprising:

sensors that detect engine operating conditions and the compression ratio, and a control unit configured to be electronically connected to the sensors, the variable intake-air quantity mechanism, and the variable compression ratio mechanisms for controlling the variable intake-air quantity mechanism based on the compression ratio as well as the engine operating conditions; wherein the control unit includes:
- (a) a first required load setting section that sets a first required load based on the engine operating conditions;
- (b) an upper limit load setting section that sets an upper limit load based on the compression ratio; and
- (c) a second required load setting section that sets a second required load by limiting the first required load by the upper limit load, wherein the control unit controls the variable intake-air quantity mechanism to satisfy the second required load, while controlling the compression ratio based on the engine operating conditions by the variable compression ratio mechanism.

3. The intake-air control system as claimed in claim 2, wherein:
the second required load is set as a lower one of the first required load and the upper limit load.

4. The intake-air control system as claimed in claim 2, wherein: the control unit further comprises:
- (d) a third required load setting section that sets a third required load by making a predetermined phase-lag compensation for the second required load; and
- (e) a fourth required load setting section that sets a lower one of the first and third required loads as a fourth required load, wherein the control unit controls the variable intake-air quantity mechanism to satisfy the fourth required load, while controlling the compression ratio based on the engine operating conditions by the variable compression ratio mechanism.

5. The intake-air control system as claimed in claim 4, wherein:
the second required load is set as a lower one of the first required load and the upper limit load.

6. The intake-air control system as claimed in claim 2, wherein:
the upper limit load is set to decrease as the compression ratio increases.

7. The intake-air control system as claimed in claim 2, wherein:
the upper limit load is set considering a cylinder wall temperature as well as the compression ratio.

8. The intake-air control system as claimed in claim 7, wherein:
the upper limit load is set to decrease as the cylinder wall temperature increases.

9. The intake-air control system as claimed in claim 2, wherein:
the variable intake-air quantity mechanism comprises an electronically-controlled throttle mechanism which is disposed in an induction system of the engine and whose throttle opening is changeable for controlling the quantity of fresh air entering the engine.

10. The intake-air control system as claimed in claim 2, wherein:
the variable intake-air quantity mechanism comprises a variable intake valve characteristic control mechanism whose valve characteristic is changeable for controlling the quantity of fresh air entering the engine.

11. The intake-air control system as claimed in claim 2, wherein:
the variable compression ratio mechanism comprises:
- (a) an upper link adapted to be mechanically linked at one end to a reciprocating piston via a piston pin;
- (b) a lower link adapted to be mechanically linked to another end of the upper link via a first connecting pin and rotatably mounted on a crankpin of an engine crankshaft;
- (c) a control link adapted to be mechanically linked at one end to the lower link via a second connecting pin and rockably supported at another end by an engine body so that oscillating motion of the control link, relative to the engine body, is permitted; and
- (d) a control shaft fitted to the another end of the control link for varying a center of the oscillating motion of the control link relative to the engine body, when changing the compression ratio.

12. The intake-air control system as claimed in claim 11, wherein:
the control shaft comprises a relatively small-diameter shaft portion and a relatively large-diameter shaft portion whose axis is eccentric to an axis of the small-diameter shaft portion and whose outer periphery is rotatably fitted to the another end of the control link, the small-diameter shaft portion and the large-diameter shaft portion being fixedly connected to each other, and
which further comprises an actuator having a drive shaft, which is connected to the small-diameter shaft portion of the control shaft for varying the center of the oscillating motion of the control link, relative to the engine body, by driving the control shaft when changing the compression ratio.

13. An intake-air control system for an engine enabling an intake-air quantity and a compression ratio to be variably controlled, comprising:

sensors that detect engine operating conditions and the compression ratio;

a control unit configured to be electronically connected to the sensors for feedback-controlling the intake-air quantity based on the compression ratio as well as the engine operating conditions while feedback-controlling the compression ratio based on the engine operating conditions; wherein the control unit is configured to execute phase-matching between an intake-air quantity change occurring based on intake-air quantity control and a compression ratio change occurring based on compression ratio control, by considering a relatively slower response in the compression ratio change than a response in the intake-air quantity change; wherein the control unit is configured for putting, based on the compression ratio, an upper limit of a first required load corresponding to the intake-air quantity that is determined based on the engine operating conditions, for producing a second required load limited within the upper limit; and wherein the control unit is configured for feedback-controlling the intake-air quantity to satisfy the second required loads while feedback-controlling the compression ratio based on the engine operating conditions.

14. The intake-air control system as claimed in claim 13, wherein:

the control unit is configured to set a third required load by making a predetermined phase-lag compensation for the second required load;

the control unit is configured to set a lower one of the first and third required loads as a fourth required load; and the control unit is configured for feedback-controlling the intake-air quantity to satisfy the fourth required load, while feedback-controlling the compression ratio based on the engine operating conditions.

15. The intake-air control system as claimed in claim 13, wherein:

the upper limit is set to decrease as the compression ratio increases.

16. The intake-air control system as claimed in claim 13, wherein:

the upper limit is set considering a cylinder wall temperature as well as the compression ratio.

17. The intake-air control system as claimed in claim 16, wherein:

the upper limit is set to decrease as the cylinder wall temperature increases.

18. A method of variably controlling an intake-air quantity of fresh air entering an engine and a compression ratio of the engine, the method comprising:

detecting engine operating conditions and the compression ratio;

feedback-controlling the intake-air quantity based on the compression ratio as well as the engine operating conditions, while feedback-controlling the compression ratio based on the engine operating conditions; and executing phase-matching between an intake-air quantity change occurring based on intake-air quantity control and a compression ratio change occurring based on compression ratio control, considering a relatively slower response in the compression ratio change than a response in the intake-air quantity change;

putting, based on the compression ratio, an upper limit of a first required load corresponding to the intake-air quantity that is determined based on the engine operating conditions, for producing a second required load limited within the upper limit; and feedback-controlling the intake-air quantity to satisfy the second required load, while feedback-controlling the compression ratio based on the engine operating conditions.

19. The method as claimed in claim 18, further comprising:

determining a third required load by making a predetermined phase-lag compensation for the second required load;

determining a lower one of the first and third required loads as a fourth required load; and feedback-controlling the intake-air quantity to satisfy the fourth required load, while feedback-controlling the compression ratio based on the engine operating conditions.

* * * * *